United States Patent [19]

Sasou et al.

[11] Patent Number: 5,592,400
[45] Date of Patent: Jan. 7, 1997

[54] CARD ISSUE SYSTEM

[75] Inventors: Hiroshi Sasou; Atsushi Yamazaki, both of Tokyo, Japan

[73] Assignee: Tamura Electric Works, Ltd., Japan

[21] Appl. No.: 294,134

[22] Filed: Aug. 22, 1994

[30] Foreign Application Priority Data

Aug. 27, 1993 [JP] Japan .................................. 5-234343

[51] Int. Cl.$^6$ ................................................ G06F 17/00
[52] U.S. Cl. .................... 364/514 R; 235/375; 235/379; 235/380; 235/487; 235/492
[58] Field of Search ......................... 364/514 R; 235/375, 235/380, 379, 487, 492

[56] References Cited

U.S. PATENT DOCUMENTS

| | | | |
|---|---|---|---|
| 5,266,781 | 11/1993 | Warwick et al. | 235/375 |
| 5,332,889 | 7/1994 | Lundstrom et al. | 235/380 |
| 5,378,884 | 1/1995 | Lundstrom et al. | 234/441 |
| 5,440,108 | 8/1995 | Tran et al. | 235/381 |
| 5,451,037 | 9/1995 | Lundstrom | 270/1.1 |

*Primary Examiner*—James P. Trammell
*Assistant Examiner*—Patrick J. Assouad
*Attorney, Agent, or Firm*—Samuels, Gauthier, Stevens & Reppert

[57] ABSTRACT

A card issue system includes a data terminal, a card issue apparatus, a common memory, interface, and a data bus. The data terminal receives card issue information including a card issue command. The card issue apparatus performs a card issue process on the basis of the card issue information from the data terminal. The common memory is arranged in the card issue apparatus and stores card issue process result information. The interface performs data interface between the data terminal and the card issue apparatus, and the card issue information from the data terminal is transmitted to the card issue apparatus through the interface. The data bus connects the common memory and the data terminal, and the card issue process result information stored in the common memory is transmitted to the data memory through the data bus.

6 Claims, 3 Drawing Sheets

CARD ISSUE SYSTEM

BACKGROUND OF THE INVENTION

The present invention relates to a card issue system constituted by a personal computer and a card issue apparatus for issuing a card in accordance with a command transmitted from the personal computer.

A personal computer is generally connected to a card issue apparatus through an RS (Recommended Standard)-232C interface. When the card issue apparatus receives the command from the personal computer through the RS-232C interface, the card issue apparatus performs a card issue process. The RS-232C interface is well known as the standard of a terminal in which signal lines having 25 pins are defined. The RS-232C interface can be connected at a speed of 20 kbits/s and a distance of 15 m or less.

More specifically, in causing the card issue apparatus to issue cards, when operations for setting the types, number, and the like of the cards to be issued are performed in a personal computer, set card issue information is transmitted to the card issue apparatus through the RS-232C interface. When the card issue apparatus receives the card issue information from the personal computer, the card issue apparatus performs a card issue process in accordance with a card type and a card count. The card issue apparatus returns information indicating non-defective and defective card counts or the like, which information is obtained as a result of the card issue process, to the personal computer through the RS-232C interface, thereby causing the personal computer to display the information.

In a conventional technique, information communicated between a personal computer and a card issue apparatus is serially transmitted/received through an RS-232C interface. For this reason, when an amount of communication between the personal computer and the card issue apparatus increases, a very long time is required for a communication process. As a result, original processes in the personal computer and the card issue apparatus are disadvantageously delayed.

More specifically, in the personal computer, the above display process, a card management process, and the like are executed by a multitask process. In the card issue apparatus, card issue processes such as an information recording process and an information reproducing process for each card conveyed at a high speed are executed by a multitask process. For this reason, when a time required for a serial transmission process performed through the RS-232C interface increases, original processes such as the card management process in the personal computer and the card issue process in the card issue apparatus are delayed. In the worst case, these original processes cannot be executed.

SUMMARY OF THE INVENTION

It is an object of the present invention to provide a card issue system capable of quickly performing a data communication process even when an amount of data communication between a personal computer and a card issue apparatus increases.

It is another object of the present invention to provide a card issue system which does not adversely affect original processes even when an amount of data communication between a personal computer and a card issue apparatus increases.

In order to achieve the above objects, according to the present invention, there is provided a card issue system comprising a data terminal for receiving card issue information including a card issue command, a card issue apparatus for performing a card issue process on the basis of the card issue information from the data terminal, a common memory, arranged in the card issue apparatus, for storing card issue process result information, interface means for performing data interface between the data terminal and the card issue apparatus, the card issue information from the data terminal being transmitted to the card issue apparatus through the interface means, and a data bus for connecting the common memory and the data terminal, the card issue process result information stored in the common memory being transmitted to the data memory through the data bus.

DESCRIPTION OF THE PREFERRED EMBODIMENT

The present invention will be described below with reference to the accompanying drawings.

Figure 1:
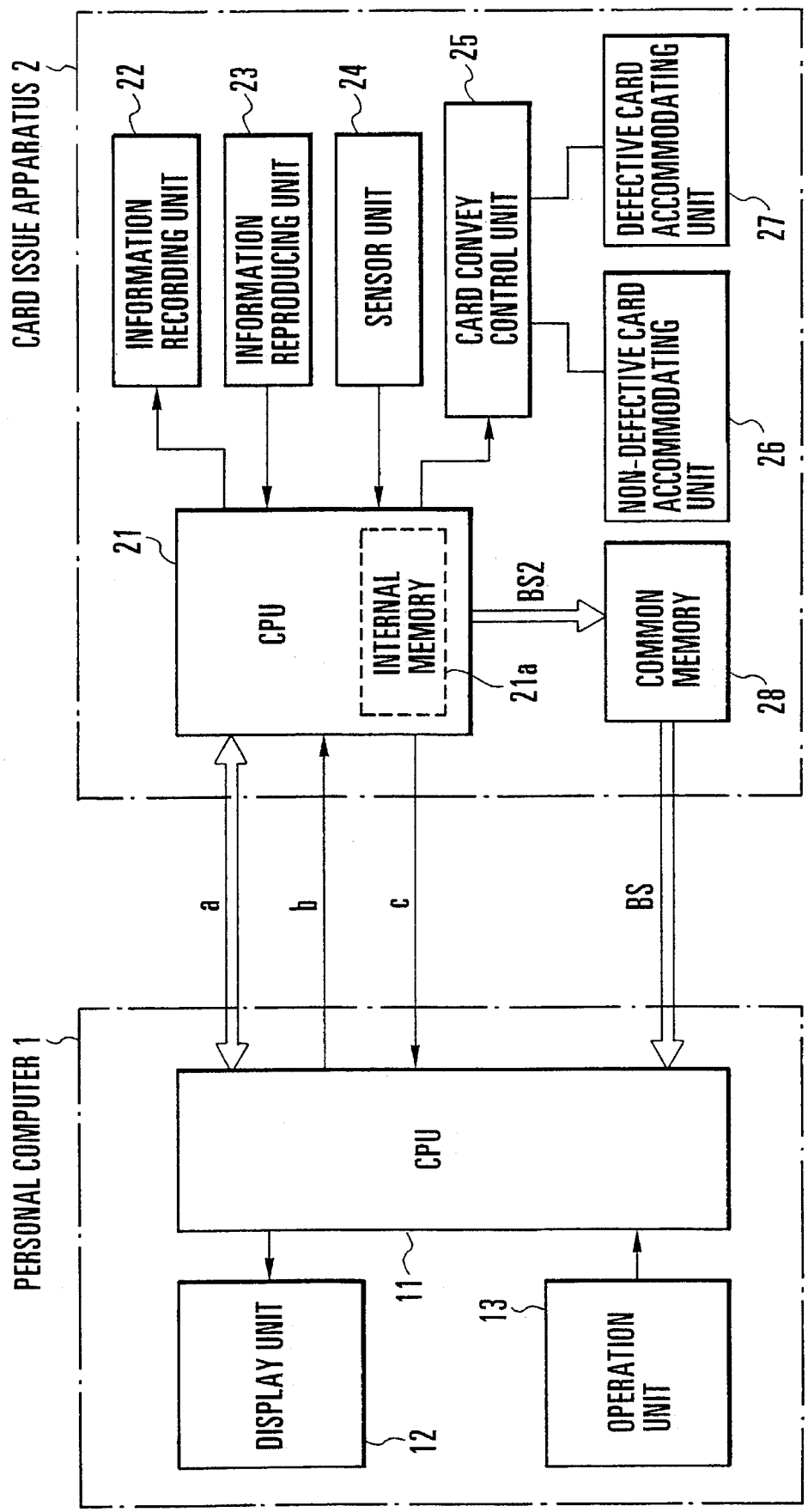
FIG. 1 is a block diagram showing a card issue system according to an embodiment of the present invention.

FIG. 1 shows a card issue system according to an embodiment of the present invention. This system is a card issue system for issuing a prepaid card on which value information corresponding to a prepaid amount is magnetically recorded on the basis of a command from a personal computer connected to the system through a communication line. Referring to FIG. 1, reference numeral 1 denotes a personal computer having a communication function, for transmitting a card issue command on the basis of an operation performed by an operator; and 2, a card issue apparatus for issuing a card on the basis of the command from the personal computer 1. In this case, the personal computer 1 is constituted by a CPU (Central Processing Unit) 11 for performing various process control operations including a communication control operation, a display unit 12 for displaying various pieces of information including card count information from the CPU 11, and an operation unit 13 for allowing an operator to input card issue information.

The card issue apparatus 2 is constituted by a CPU 21 for performing card issue control operations consisting of an operation of conveying cards, an operation of recording information on the cards, an operation of reading the information from the cards, an operation of checking the readout information, an operation of sorting the cards, or the like, an information recording unit 22 for recording information on cards conveyed on a card convey path (not shown), an information reproducing unit 23 for reproducing information recorded on cards, a sensor unit 24 for detecting the positions of cards conveyed on the card convey path, a card convey control unit 25 for controlling a card convey operation and sorting cards into non-defective cards and defective cards, a non-defective card accommodating unit 26 for accommodating sorted non-defective cards, a defective card accommodating unit 27 for accommodating defective cards except for non-defective cards, and a common memory 28 for storing card count information to be transmitted to the personal computer 1. The CPU 21 comprises an internal memory 21a for temporarily storing card count information to be transferred to the common memory 28.

In this case, when the card issue apparatus 2 is to be caused to issue cards, and card issue information such as the types and number of the cards to be issued is set and input by the operation unit 13 of the personal computer 1, the CPU 11 detects the card issue information and serially transmits the input card issue information to the card issue apparatus 2 through an RS-232C interface a. When the CPU 21 of the card issue apparatus 2 receives the card issue information from the personal computer 1, the CPU 21 instructs the card convey control unit 25 to sequentially convey non-recorded cards stacked in a card insertion unit (not shown) on the card convey path. The CPU 21 causes the information recording unit 22 to record information on a card while the sensor unit 24 checks a card convey position, and the CPU 21 causes the information reproducing unit 23 to reproduce the information of the recorded card to check whether the information is correctly recorded. In accordance with the result of the checking operation, the card is sorted and accommodated in one of the non-defective card accommodating unit 26 and the defective card accommodating unit 27. A non-defective card count and a defective card count are stored in the internal memory 21a.

In order to prevent the access contention between the personal computer 1 and the common memory 28, the CPU 21 writes the non-defective card count and the defective card count, which indicate a card issue result and are transferred from the internal memory 21a to the common memory 28 while checking the level of a control signal line b which is transmitted from the personal computer 1 and indicates that the common memory is in use. On the other hand, in order to prevent the access contention between the card issue apparatus 2 and the common memory 28, the CPU 11 of the personal computer 1 parallelly reads information such as non-defective card count information or defective card count information in the common memory 28 through a data bus BS while checking the level of a control signal line c which is transmitted from the card issue apparatus 2 and indicates that the common memory is accessible, and the CPU 11 displays the information on the display unit 12.

Figure 2A:
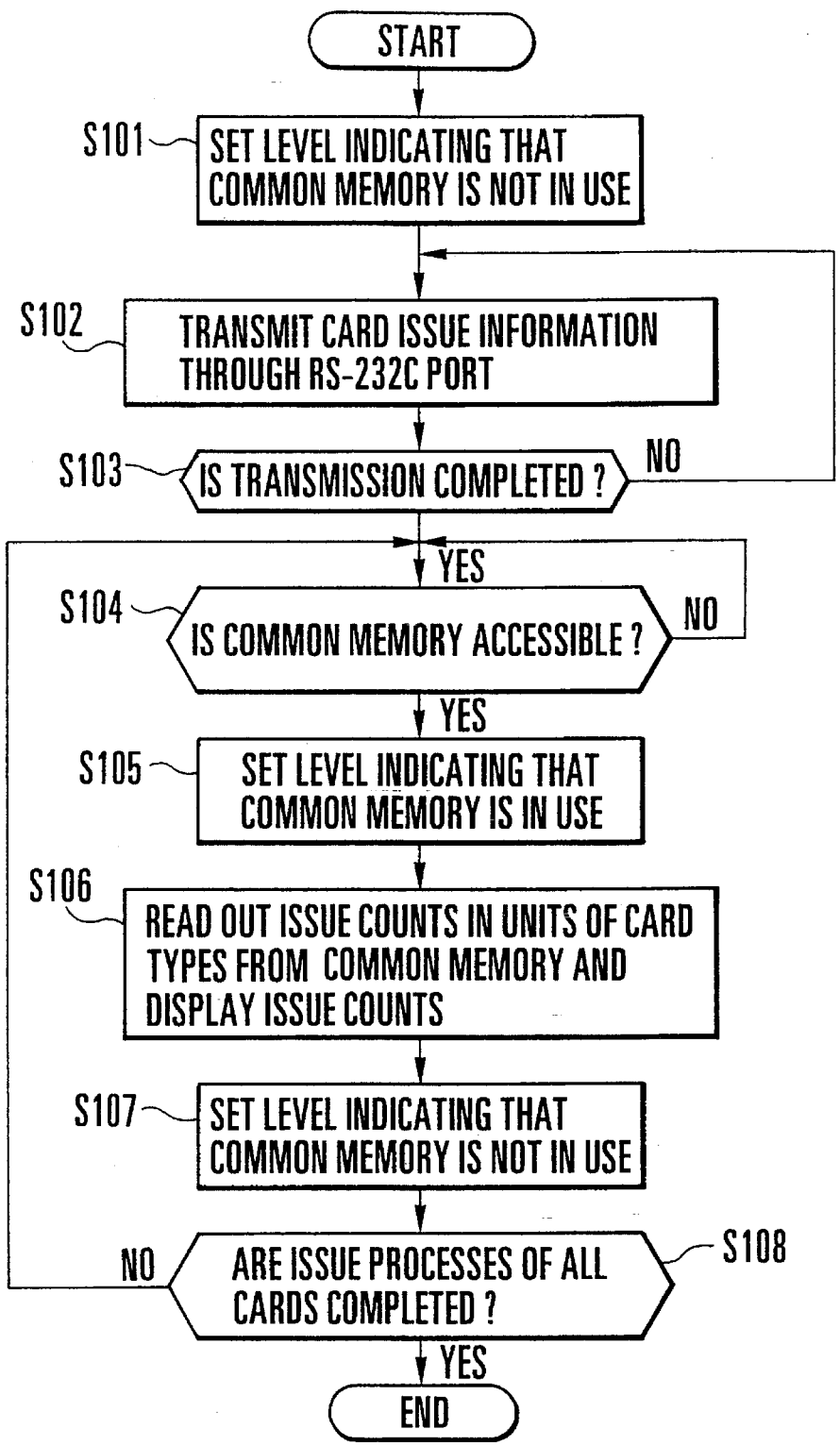
FIGS. 2A and 2B are flow charts showing data communication operations between a personal computer and a card issue apparatus which constitute the system in FIG. 1.
Figure 2B:
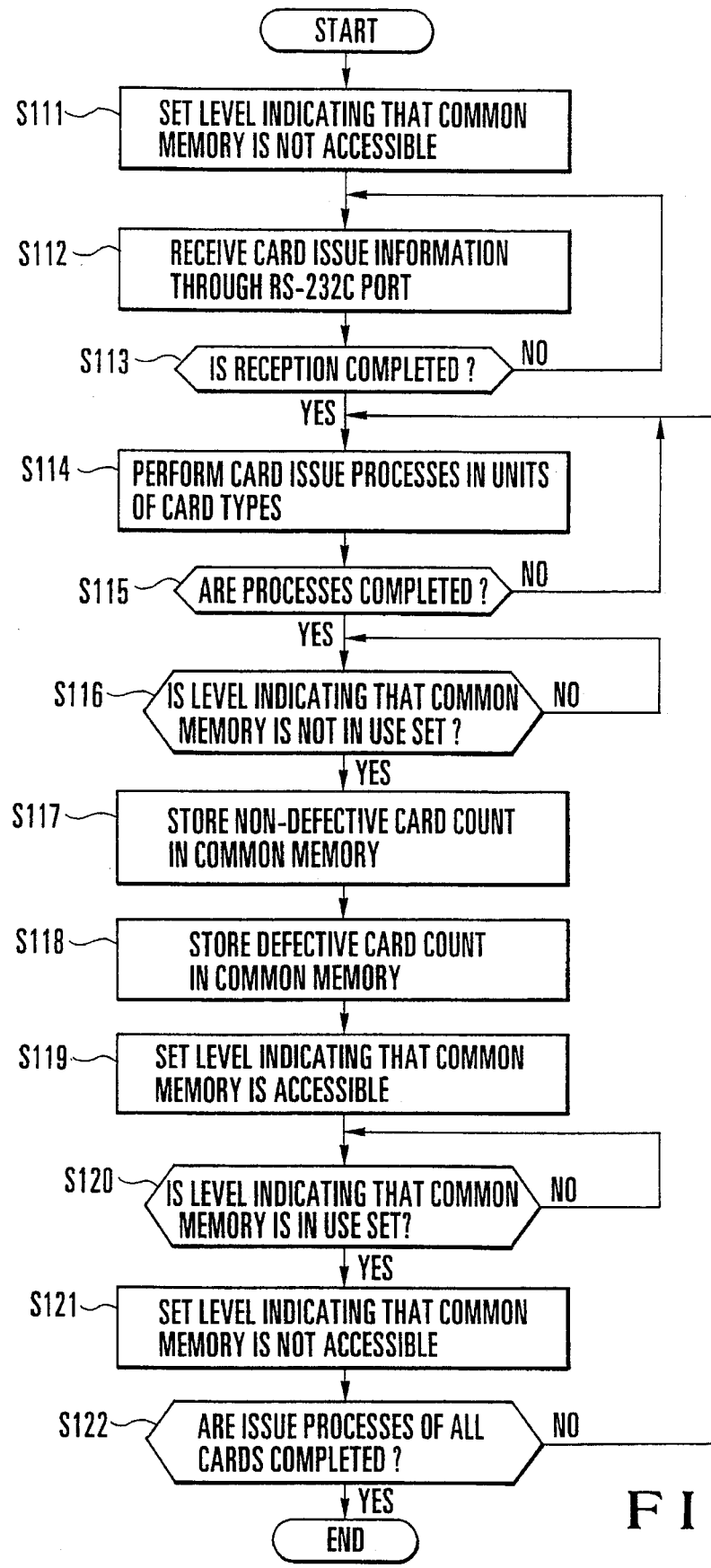

FIG. 2A shows the operation of the personal computer 1, and FIG. 2B shows the operation of the card issue apparatus 2. A data communication operation included in the card issue operation of this system will be described below with reference to the flow charts of FIGS. 2A and 2B. Referring to FIG. 2A, prior to a data communication operation, a level, e.g., "L" level, indicating that the common memory 28 is not in use is set in step S101. When the operation unit 13 inputs an instruction for issuing many types of cards, card issue information consisting of card types, a card issue count, and the like is transmitted to the card issue apparatus 2 through the RS-232C interface a in step S102. When the transmitting operation of the card issue information is completed, if "YES" is set in step S103, the CPU 11 checks the level of the control signal line c to check whether the common memory 28 is accessible.

At this time, a card issue process is not completed in the card issue apparatus 2 yet, and a non-defective card count and a defective card count are not stored in the common memory 28 yet. For this reason, the control signal line c has a level indicating that the common memory 28 is not accessible, and the CPU 11 cannot access the common memory 28 not to read out the information of the card issue apparatus 2. Therefore, although the CPU 11 is set in a standby state with respect to data communication with the card issue apparatus 2, the CPU 11 performs another process in a standby state.

Thereafter, in the card issue apparatus 2, when an issue process for a predetermined number of cards of one type is completed, the level of the control signal line c goes to a level indicating that the common memory 28 is accessible. In this case, if YES in step S104, the flow advances to step S105. In step S105, the CPU 11 sets a level, e.g., "H" level, indicating that the common memory 28 is in use in the control signal line b. In step S106, the CPU 11 reads out, from the common memory 28 through the data bus BS, issue count information consisting of a non-defective card count and a defective card count of the issued cards with respect to one card type and obtained as a process result in the card issue apparatus 2 and displays the issue count information on the display unit 12.

In step S107, a level indicating that the common memory 28 is not in use is set in the control signal line b, and the flow advances to step S108 to check whether the card issue processes of the cards of all the card types are completed in the card issue apparatus 2. More specifically, it is checked whether the card issue processes with respect to the plurality of card types transmitted in step S102 are completed. When these processes are not completed, the flow returns to step S104 to obtain issue information with respect to the next card type, and it is checked whether the common memory 28 is accessible.

In this manner, in the card issue apparatus 2, pieces of defective/non-defective card count information of the issued cards obtained as results obtained by performing issue processes in units of card types are sequentially read out from the common memory 28 and displayed on the display unit 12. When all process results are obtained, "YES" is set in step S108, and data communication process of the personal computer 1 is completed.

The data communication operation of the CPU 21 of the card issue apparatus 2 interlocked with the data communication operation of the personal computer 1 will be described below with reference to the flow chart of FIG. 2B. Referring to FIG. 2B, in step S111, a level, e.g., "L" level, indicating that the common memory 28 is not accessible is set in the control signal line c. In step S112, the CPU 21 receives card issue information transmitted from the personal computer 1 through the RS-232C interface a. When this reception is completed, and "YES" is set in step S113, the flow advances to step S114. In step S114, with respect to cards of one card type, card issue processes consisting of a process of recording information on the cards, a process of reading out the recorded information from the cards, a process of checking whether the readout recorded information is non-defective or defective, and a process of sorting and accommodating the cards into the accommodating units 26 and 27 are executed.

When card issue processes with respect to one card type are completed, and "YES" is set in step S115, it is checked in step S116 whether the control signal line b has a level indicating that the common memory 28 is not in use. When the common memory 28 is not in use, the personal computer 1 does not use the common memory 28. Therefore, it is determined that the common memory 28 is usable. The CPU 21 transfers the non-defective card count information temporarily stored in the internal memory 21a by the card issue processes to a corresponding area of the common memory 28 in step S117. If there is a defective card, defective card count information is stored in another area of the common memory 28 in step S118.

In step S119, a level indicating that the common memory 28 is accessible is set in a control signal line to permit the personal computer 1 to use the common memory 28. The personal computer 1 reads out information from the common memory 28, and the level indicating that the common memory 28 is in use is set in the control signal line b. In this case, "YES" is set in step S120, and a level indicating that the common memory 28 is not accessible is immediately set in the control signal line c. The flow advances to step S122 to check whether the issue processes of all the cards are completed. If NO in step S122, the flow returns to step S114 to perform the issue processes of cards of the next type. The process result is transferred from the internal memory 21a and stored in the common memory 28. In this manner, card issue processes are sequentially performed in units of card types with respect to all the card types commanded by the personal computer 1. Each time a card issue process is performed, the process result is stored in the common memory 28 and transmitted to the personal computer 1.

Note that, in the above description, the CPU 21 is defined as a detection means for detecting that the common memory 28 is not used by the personal computer 1 in step S116, the CPU 21 is defined as a storage control means for transferring the information of a card issue result from the internal memory 21a to the common memory to store the information in the common memory in steps S117 and S118, and the CPU 21 is defined as a use permission means for permitting the personal computer to use the common memory 28 upon completion of storing the information of the card issue result in step S119. On the other hand, the CPU 11 of the personal computer 1 is defined as a read means for reading out the information of the card issue result from the common memory 28 in accordance with a use permission command from the card issue apparatus 2 in step 106, and the CPU 11 is defined as an informing means for informing the card issue apparatus 2 that the common memory 28 is in use and that the common memory 28 is not in use during a reading operation from the common memory 28 and upon completion of the reading operation in steps S105 and S107, respectively.

As described above, according to this embodiment, when the common memory 28 is to be accessed by the personal computer 1 and the card issue apparatus 2, the common memory 28 is accessed while the use conditions of the common memory 28 are confirmed. For this reason, a card issue count can be transmitted to the personal computer 1 within a short time while the access of the personal computer 1 to the common memory 28 is prevented from being competed against the access of the card issue apparatus 2 to the common memory 28.

As has been described above, according to the present invention, card issue information from the personal computer is communicated through the RS-232C interface, a card issue process is executed in the card issue apparatus on the basis of the card issue information, and the information of a card issue process result is communicated to the personal computer through the common memory. For this reason, even when an amount of data communication between the personal computer and the card issue apparatus increases, a time required for data communication can be shortened. Therefore, in the personal computer and card issue apparatus, original processes thereof can be executed in real time.

What is claimed is:

1. A card issue system comprising:

a data terminal for receiving card issue information including a card issue command;

a card issue apparatus for performing a card issue process on the basis of the card issue information from said data terminal;

a common memory, arranged in said card issue apparatus, for storing card issue process result information;

interface means for performing data interface between said data terminal and said card issue apparatus, the card issue information from said data terminal being transmitted to said card issue apparatus through said interface means; and a data bus for connecting said common memory and said data terminal, the card issue process result information stored in said common memory being transmitted to said data memory through said data bus, wherein, said card issue apparatus is comprises detection means for detecting that said common memory is used by said data terminal, storage control means for storing the card issue result information in said common memory on the basis of a detection output from said detection means, and use permission means for permitting said data terminal to use said common memory upon completion of a storing operation performed by said storage control means, and said data terminal comprises read means for reading out the card issue result information from said common memory in accordance with a use permission command from said use permission means, and informing means for informing said card issue apparatus that said common memory is in use during a reading operation performed by said read means and informing said card issue apparatus that said common memory is not in use upon completion of the reading operation performed by said read means.

2. A system according to claim 1, wherein said data terminal is constituted by a personal computer comprising an operation unit for inputting card issue information, a display unit for displaying the transmitted card issue process result information, and a central processing unit for performing data communication control between said card issue apparatus and said central processing unit.

3. A system according to claim 1, wherein said interface means is constituted by an RS-232C interface.

4. A system according to claim 1, wherein said card issue apparatus comprises an internal memory for temporarily storing a non-defective card count and a defective card count on the basis of a card issue process, and said storage control means for transferring and storing the non-defective card count and defective card count from said internal memory as card issue process result information to and in said common memory.

5. A system according to claim 1, wherein said informing means sets a level signal corresponding to a first control signal line to inform said card issue apparatus that said common memory is in use and that said common memory is not in use, and said use permission means sets a corresponding level signal in a second control signal line to inform said data terminal that said data terminal can be permitted to use said common memory.

6. A system according to claim 1, wherein said card issue apparatus is constituted by an information recording unit for recording information on a card conveyed on a card convey path, an information reproducing unit for reproducing the information recorded by said information recording unit from said card, a sensor for detecting a position of said card conveyed on said card convey path, a central processing unit for checking, on the basis of the information reproduced by said information reproducing unit, whether said card is non-defective or defective and performing data communication control between said central processing unit and said data terminal, a convey control unit for controlling a card convey operation and sorting the conveyed card on the basis of a check result obtained by checking whether the card is non-defective or defective, and a non-defective card accommodating unit and a defective card accommodating unit for respectively accommodating conveyed non-defective and defective cards sorted by said convey control unit.

* * * * *